US008171076B2

(12) United States Patent
Matsunaga (10) Patent No.: US 8,171,076 B2
(45) Date of Patent: May 1, 2012

(54) SYSTEM AND METHOD FOR PROVIDING PRESENCE INFORMATION (75) Inventor: Toshihiko Matsunaga, Osaka (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 12/662,995

(22) Filed: May 14, 2010

(65) Prior Publication Data

US 2011/0055319 A1  Mar. 3, 2011

(30) Foreign Application Priority Data

Aug. 25, 2009 (JP) ................................ 2009-194504

(51) Int. Cl.
G06F 15/16 (2006.01)
G06F 15/173 (2006.01)
(52) U.S. Cl. ........................................ 709/203; 709/224
(58) Field of Classification Search .................... 709/203
See application file for complete search history.

(56) References Cited

U.S. PATENT DOCUMENTS

| | | | |
|---|---|---|---|
| 7,152,045 B2* | 12/2006 | Hoffman | 705/43 |
| 7,318,001 B2* | 1/2008 | Clark | 702/94 |
| 7,426,538 B2* | 9/2008 | Bodin et al. | 709/204 |
| 7,463,166 B2* | 12/2008 | Segura Gordillo et al. | 340/932.2 |
| 7,472,268 B2* | 12/2008 | Gray | 713/150 |
| 7,882,514 B2* | 2/2011 | Nielsen et al. | 725/14 |
| 7,921,369 B2* | 4/2011 | Bill | 715/753 |
| 7,937,461 B2* | 5/2011 | Kutzik et al. | 709/224 |
| 7,958,226 B2* | 6/2011 | Bernardi et al. | 709/224 |
| 2006/0010240 A1 | 1/2006 | Chuah | |
| 2006/0209072 A1* | 9/2006 | Jairam et al. | 345/440 |
| 2007/0239755 A1* | 10/2007 | Mahoney | 707/102 |
| 2008/0159072 A1* | 7/2008 | Witczak | 367/13 |
| 2008/0183866 A1* | 7/2008 | Maeda et al. | 709/224 |
| 2008/0240384 A1 | 10/2008 | Suryanarayana et al. | |
| 2008/0242231 A1* | 10/2008 | Gray | 455/66.1 |
| 2008/0278312 A1 | 11/2008 | Kristensson et al. | |
| 2008/0292079 A1* | 11/2008 | Toutain et al. | 379/201.01 |
| 2010/0095109 A1* | 4/2010 | McColgan et al. | 713/151 |
| 2010/0228826 A1* | 9/2010 | Marlow et al. | 709/204 |
| 2010/0299615 A1* | 11/2010 | Miluzzo et al. | 715/752 |
| 2011/0029359 A1* | 2/2011 | Roeding et al. | 705/14.1 |

FOREIGN PATENT DOCUMENTS

WO  WO-2009/043020 A2  4/2009

OTHER PUBLICATIONS

Jacco Brok et al., "Enabling New Services by Exploiting Presence and Context Information in IMS", Bell Labs Technical Journal, vol. 4, No. 10, pp. 83-100 (2006).
Gonzalo Camarillo, Miguel A. Garc'ia-Mart'in, Wiley, "IMS Standard Text," Japanese edition of a "3G IP Multimedia Subsystem (IMS)," pp. 293-295, 300-301, 316-317.

* cited by examiner

Primary Examiner — Lynn Feild
Assistant Examiner — Melvin H Pollack
(74) Attorney, Agent, or Firm — Rabin & Berdo, P.C.

(57) ABSTRACT

A method and a system for providing presence information is disclosed which can incorporate non-presence-ready terminal nodes such as sensor node terminals and combine a plurality of pieces of presence information from a plurality of nodes, thereby providing presence information with improved reliability. The method includes creating circumstance presence information associated with a user in response to a change in value of sensor data transmitted from at least one sensor node terminal. For a presence server to deliver presence information, the method also includes delivering circumstance presence information created in relation to the user either in place of the presence information or in combination with the presence information.

5 Claims, 8 Drawing Sheets

| SENSOR ADDRESS | SENSING SETTING VALUE | PRESENCE DEFINITION | SERVER ADDRESS | VALID FLAG |
|---|---|---|---|---|
| SENSOR 1 | 10 SECONDS | DATA VALUE < 30.0 | SERVER 1 | ON |
| SENSOR 2 | 20 SECONDS | DATA VALUE > 3.5 | SERVER 1 | OFF |
| SENSOR 3 | 60 SECONDS | DATA VALUE < 5.3 | SERVER 2 | ON |
| SENSOR 4 | 3600 SECONDS | DATA VALUE = 4 | SERVER 3 | ON |

SYSTEM AND METHOD FOR PROVIDING PRESENCE INFORMATION

BACKGROUND OF THE INVENTION

1. Field of the Invention

The present invention relates to a presence information provision method for providing mainly data communication service to a user and providing presence service to the user in order to provide the data communication service with improved effectiveness in a communication system having a plurality of communication nodes such as a communication terminal used by the user. The invention also relates to a presence information provision system for performing the method.

2. Description of the Related Art

The presence service is defined as informing one user of another user's presence information that is indicative of presence such as the another user's contract status, availability for communications, and whether he or she will respond to a message (see Non Patent Document 1). For example, a presence service by a communication system for providing telephone call services is configured to inform one user of another user's availability for call connections or whether he or she will respond to an incoming call.

Figure 1:
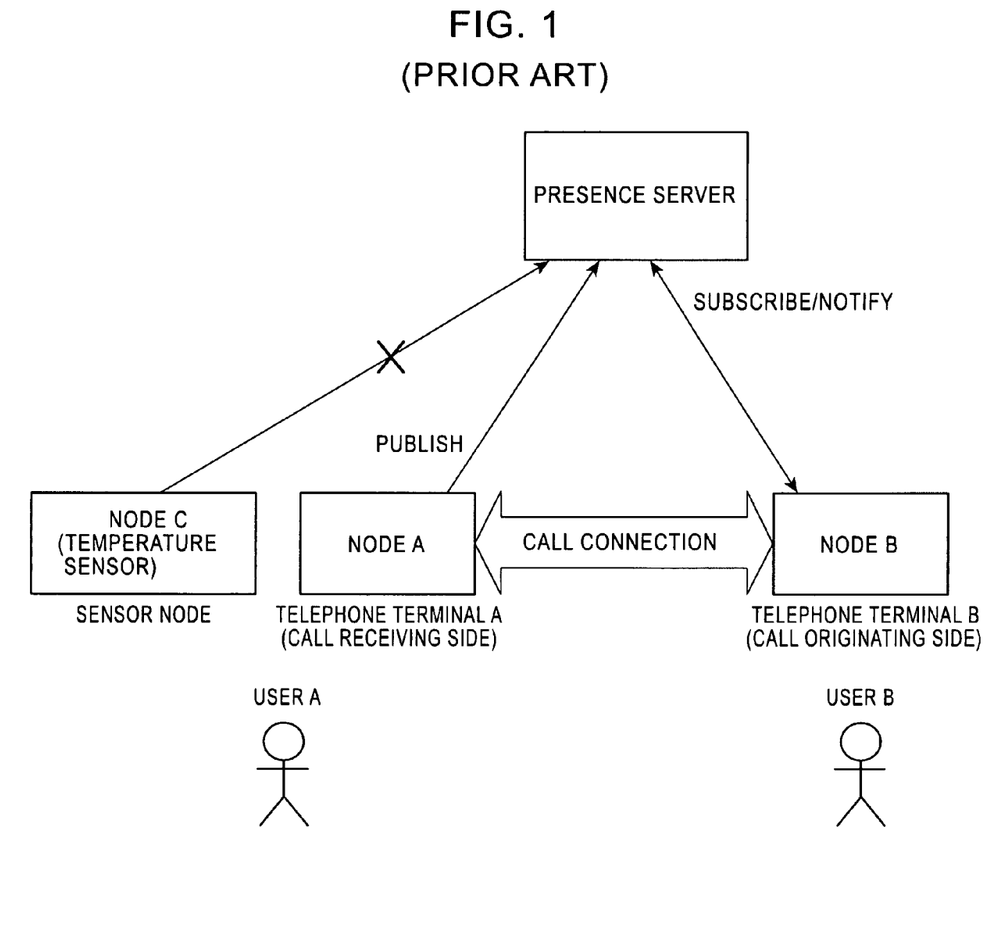
FIG. 1 is an explanatory view illustrating how presence information is exchanged in a conventional presence service.

FIG. 1 is a view illustrating how to exchange presence information in a conventional presence service.

In FIG. 1, it is assumed that a user A uses a communication terminal A (node A), a user B uses a communication terminal B (node B), and a presence server is available for providing control to presence services.

Here, suppose that the user A is going to inform another user of the presence information that the user A will respond to the incoming call from the another user. In this case, first, the node A transmits a PUBLISH message with the presence information to the presence server. The presence server receives the transmitted presence information and then associates it with the user A to retain it therein.

Now, suppose that the user B desires a call to be connected to the user A. In this case, the node B transmits a SUBSCRIBE message directed to the node A to the presence server prior to making a call to the node A. In response to this, the presence server transmits the presence information associated with the user A to the node B as a NOTIFY message. The node B receives the presence information, acknowledges the presence of the user A based on the contents thereof, and then initiates or cancels the call connection.

The structure of presence information indicative of the presence of a person is discussed as a presence data model. The data elements of the presence data model are largely divided into three data elements: person, service, and device. The person refers to the data on the user himself/herself, for example, activity information such as being at a meeting or even emotion such as feeling sad. The service means data on communication services such as telephone calls or instant messages and may include, for example, the data on the specification or capability of an image or speech communication scheme. The device is concerned with the data on physical elements such as telephones or personal computers (PC) and may include data such as the availability for communications of whether PCs are running or the remaining level of batteries or the like. As such, the presence of a person can be expressed in the combination of the aforementioned three data elements. For example, one user may be associated with a plurality of nodes when using a telephone and a PC at the same time, in the case of which the presence information of the user can be expressed by any one of these data elements or in combination with these pieces of data.

Conventional Art Literature

Non-Patent Document

Non-Patent Document 1: Gonzalo Camarillo, Miguel A. García Martín "IMS Standard Text." (translated by Takuya Fukada and Takuya Kashima): RIC TELECOM

SUMMARY OF THE INVENTION

The data elements of the presence data model are not limited to the three elements mentioned above but may include status information such as person's surrounding circumstances or environments. For example, the ambient temperature of the user can be measured, so that the resulting temperature data may be reflected on the presence of the user. This is expected to contribute to providing presence information with improved reliability.

However, a conventional art shown in FIG. 1 would not work, for example, when the node C is a sensor node with a temperature sensor but also a non-presence-ready terminal node. In this case, as shown in FIG. 1, it was not possible to combine the temperature sensor information from the node C and the presence information on the user A from the node A into the presence information of the user A. In particular, the non-presence-ready terminal node such as the sensor node has no consistency with the presence-ready node in terms of the level of acknowledgement of the presence of a person. Thus, the sensor data could not be employed as presence information as it was.

The present invention was developed in view of the aforementioned problems. It is therefore an object of the invention is to provide a presence information provision method and system which can incorporate non-presence-ready terminal nodes such as sensor node terminals and combine a plurality of pieces of presence information from a plurality of nodes, thereby providing presence information with improved reliability.

A presence information provision method according to the present invention is directed to a communication system which includes a plurality of communication terminals each associated with the presence of a specific user and a presence server for collecting or delivering presence information indicative of the presence from or to the communication terminal. The method includes a circumstance presence information creation step of creating circumstance presence information associated with the user in response to a change in value of sensor data transmitted from at least one sensor node terminal. For the presence server to provide presence information, the method further includes a circumstance presence information delivery step of delivering the circumstance presence information created in relation to the user either in place of the presence information or in combination with the presence information.

A presence information provision system according to the present invention includes a presence server for collecting or delivering presence information indicative of presence of a specific user from or to a plurality of communication terminals each associated with the presence. The system includes a service conversion server connected to the communication terminal and the presence server for creating circumstance presence information associated with the user in response to a change in value of sensor data transmitted from at least one sensor node terminal. To provide the presence information, the presence server delivers the circumstance presence information created in relation to the user either in place of the presence information or in combination with the presence information.

The presence information provision method and system according to the present invention allow for incorporating a non-presence-ready node such as a sensor node and combining a plurality of pieces of presence information from a plurality of nodes, thereby providing the presence information with improved reliability.

DETAILED DESCRIPTION OF THE INVENTION

The present invention will now be described below in more detail with reference to the accompanying drawings in accordance with the embodiments.

Figure 2:
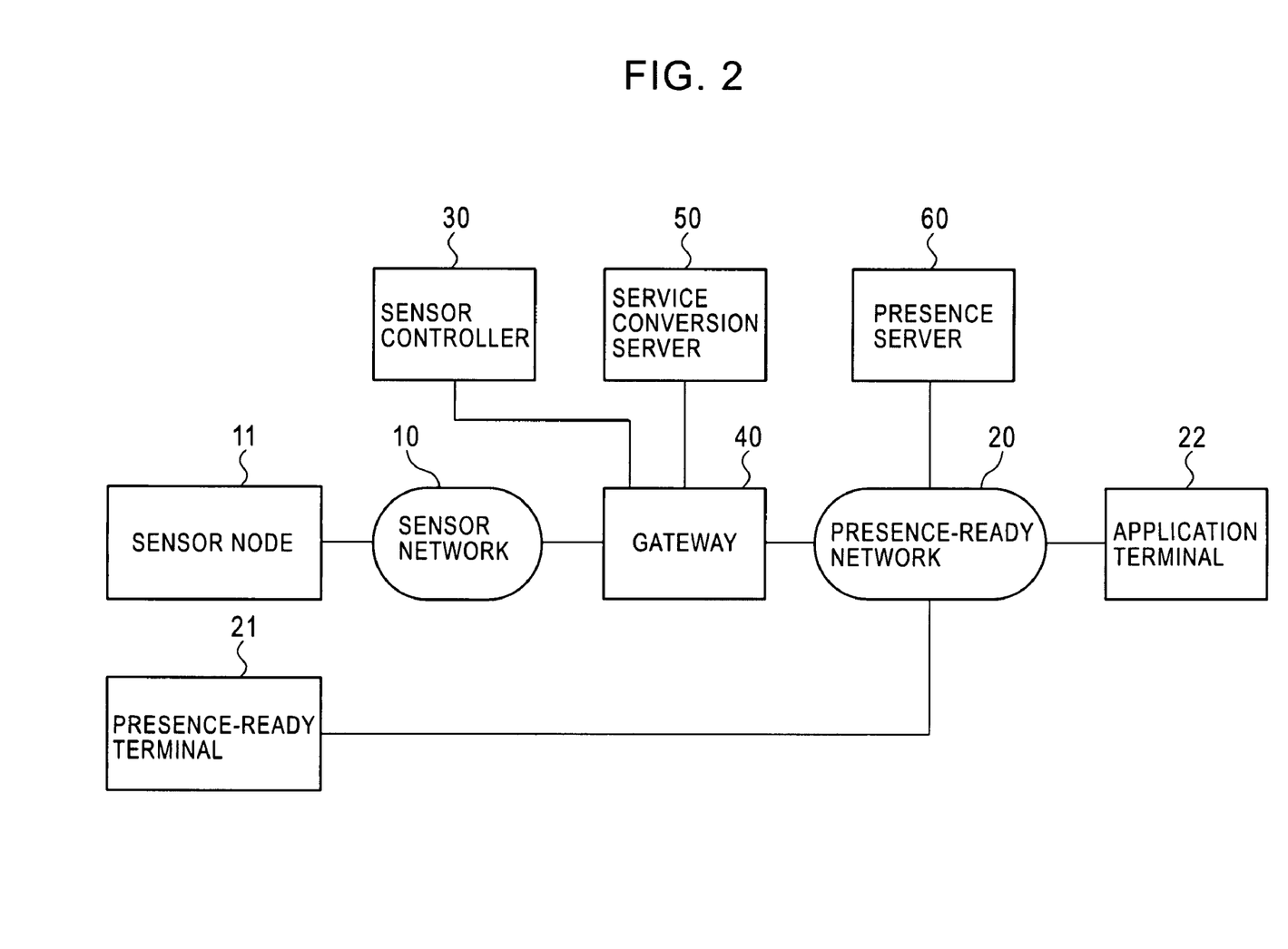
FIG. 2 is a block diagram illustrating an embodiment of the present invention and its overall configuration including a presence information provision system according to the present invention.

FIG. 2 is a view illustrating an embodiment of the present invention and its overall configuration including a presence information provision system according to the present invention. Here, a communication system which implements the presence information provision method according to the present invention includes a sensor network 10, a sensor node 11, a presence-ready network 20, a presence-ready terminal 21, an application terminal 22, a sensor controller 30, a gateway 40, a service conversion server 50, and a presence server 60. The presence information provision system according to the present invention includes at least the service conversion server 50 and the presence server 60.

In this embodiment, the sensor node 11 is a non-presence-ready terminal. The sensor node 11 is provided, for example, with a sensor such as a temperature sensor, and serves as a communication node for transmitting sensor data, which is obtained through a measurement operation of the sensor, to outside via the sensor network 10. The presence-ready terminal 21 is a communication terminal such as a typical PC and can transmit and receive presence information via the presence-ready network 20. The presence-ready network 20 may be any typical communication network so long as it can provide presence service, such as a telephone network, the Internet, or an intranet.

In the embodiment shown in FIG. 2, for purposes of illustration, only one sensor node 11 and one presence-ready terminal 21 are shown; however, the present invention is not limited thereto, but two or more sensor nodes 11 and presence-ready terminals 21 may also be employed. In this embodiment, it is assumed that a specific user is associated with the sensor node 11 and the presence-ready terminal 21.

The sensor controller 30, which is connected to the sensor node 11 via the sensor network 10, provides for each sensor node such sensing settings as the time and cycle of transmitting sensor data to be transmitted by the sensor node. As will be described later, instead of the sensor controller 30, the service conversion server 50 may transmit control data to the sensor node 11 in order to provide sensing settings directly to the sensor node 11.

The gateway 40 is connected between the sensor network 10 and the presence-ready network 20 and functions to transfer control data, control message, and presence information from one of the two networks to the other.

The application terminal 22, connected to the presence-ready network 20, is an example communication node for utilizing presence information coming from the presence-ready network 20 and can be a communication terminal such as a typical PC (Personal Computer). The application terminal 22 itself may also be a presence-ready terminal for delivering one piece of presence information.

The presence server 60, which is connected to the presence-ready network 20, is a server for managing presence service. The presence server 60 serves to receive and hold presence information from the presence-ready terminal 21, which delivers the presence information, and then send the retained presence information in response to a request from the application terminal 22 or a node that utilizes the presence information. According to the present invention, the presence server 60 also functions to receive and hold presence information transmitted from the service conversion server 50 and then transmit the presence information in response to a request from the application terminal 22.

The service conversion server 50, which is connected to the gateway 40, serves to convert a sensor data provision service from the sensor node 11 into a presence service via the gateway 40. This will be detailed later in relation to FIG. 3.

Note that in the aforementioned configuration, the sensor controller 30 and the service conversion server 50 are connected to the gateway 40; however, the present invention is not limited thereto. The sensor controller 30 may be connected directly to the sensor network 10 and the service conversion server 50 may also be connected directly to the presence-ready network 20, in order to implement the predetermined function.

Figure 3:
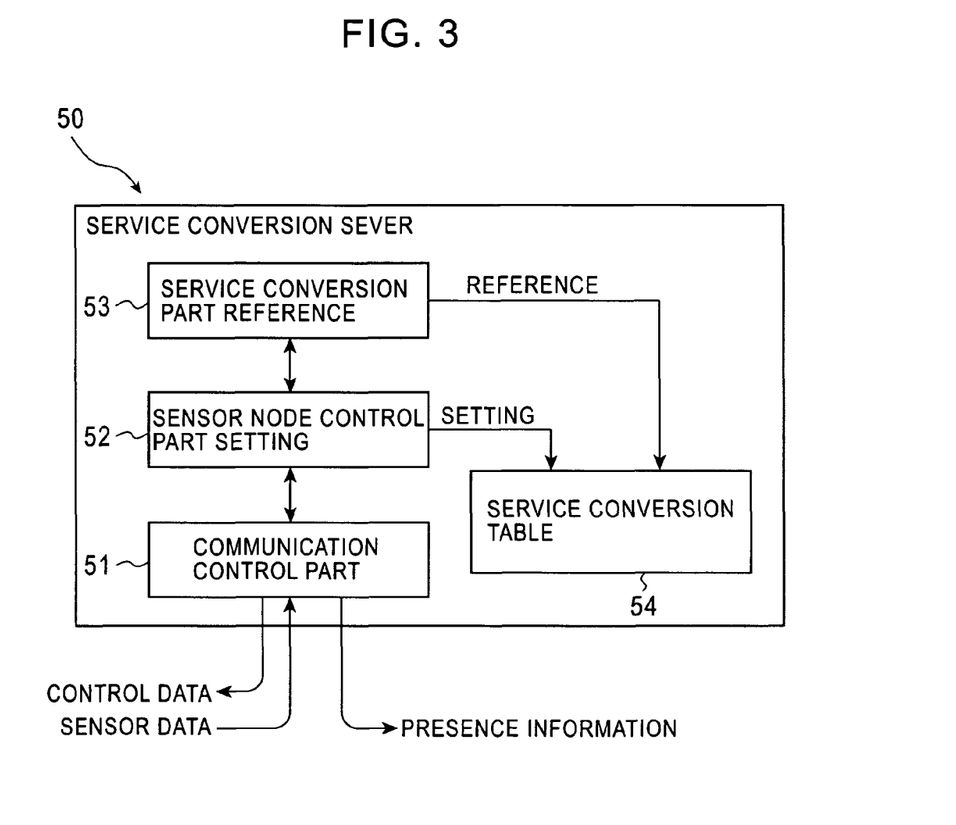
FIG. 3 is a block diagram illustrating the internal configuration of the service conversion server shown in FIG. 2.

FIG. 3 illustrates the internal configuration of the service conversion server 50 shown in FIG. 2. Here, the service conversion server 50 is made up of at least a communication control part 51, a sensor node control part 52, a service conversion processing part 53, and a service conversion table 54.

The communication control part 51 transmits and receives control data and control message to and from the sensor node 11, receives sensor data from the sensor node 11, and transmits presence information to the presence server 60.

The sensor node control part 52 monitors the running status of the sensor node 11 and sets the sensor address of the sensor node 11 and the like to the service conversion table 54 as well as enables or disables the sensor node 11 in response to the running status of the sensor node 11. Furthermore, the sensor node control part 52 creates control data in accordance with the contents of the service conversion table 54, and the sensor node control part 52 then transmits the resulting data to the sensor node 11 directly or via the sensor controller 30.

The service conversion processing part 53 converts sensor data from the sensor node 11 or a non-presence-ready terminal into presence information, thereby continually performing service conversions. For example, when the sensor node 11 is equipped with a temperature sensor and the temperature sensor provides a data value that exceeds a predetermined threshold, the service conversion processing part 53 estimates that the room temperature has been raised due to the presence of a person, thus creating presence information indicative of the presence of the person.

The service conversion table 54 retains setting information on which the service conversion processing part 53 bases for processing its presence conversions. The contents of the service conversion table 54 may be either preset manually or automatically set by the sensor node control part 52 in response to an initiation message from the sensor node 11 that is a non-presence-ready terminal.

Figure 4:
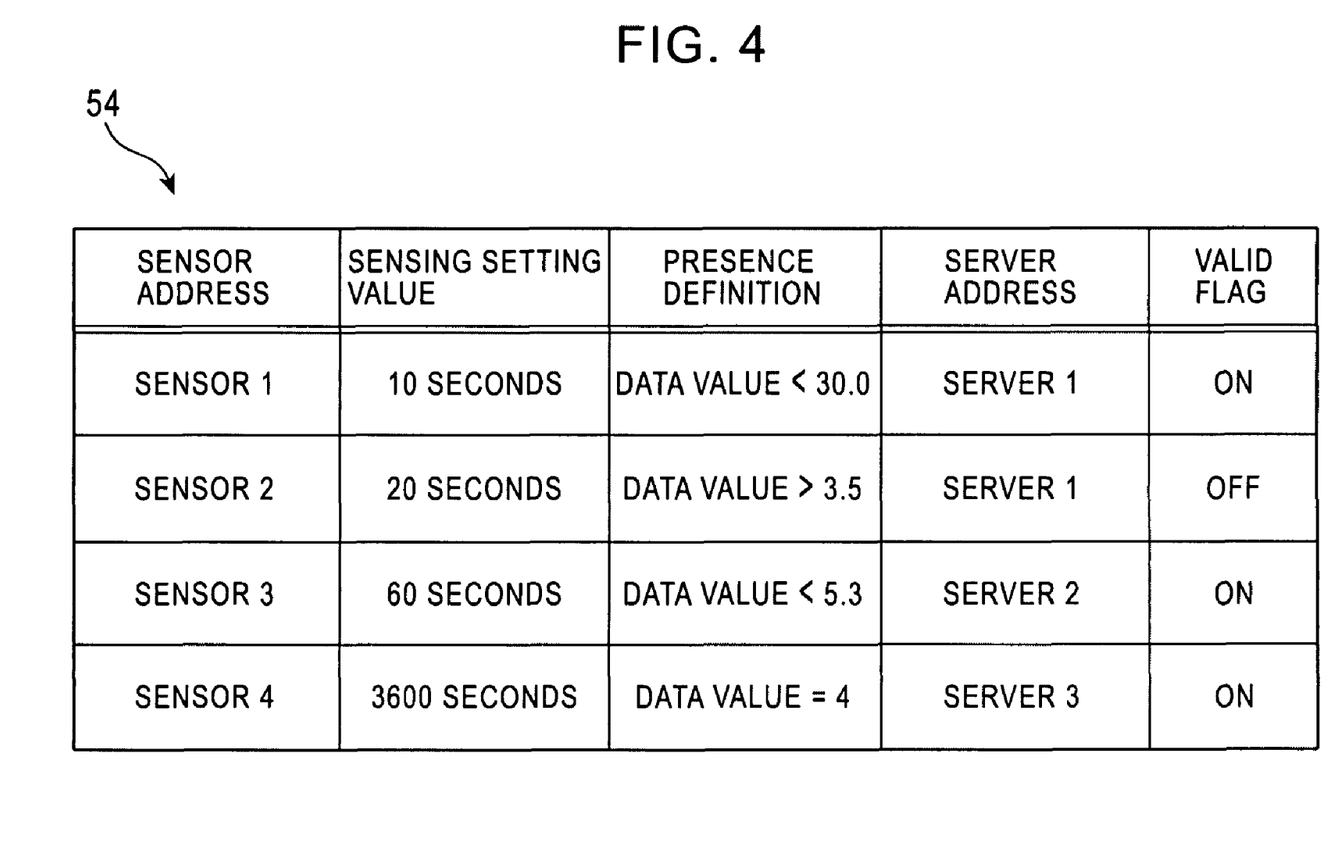
FIG. 4 is a view illustrating an example of setting the service conversion table shown in FIG. 3.

FIG. 4 illustrates an example setting of the service conversion table 54 shown in FIG. 3. For example, as illustrated, the service conversion table 54 contains entries such as a sensor address, a sensing setting value, a server address, and an enable flag, the contents of each entry being set for each sensor node.

The sensor address has a description of the network address of the sensor node 11, so that the sensor node 11 is uniquely identified in the sensor network 10. The sensing setting value, for example, has a description of information for defining a measurement mode such as an acquisition cycle at which the sensor node 11 acquires sensor data. For instance, an acquisition cycle of 10 seconds means that the sensor node 11 transmits sensor data, to be received by the service conversion server 50, at a rate of once in 10 seconds.

The presence definition has setting information for defining the correspondence between the sensor data value created by the sensor node and the contents of presence information. For example, the definition may include a description such as a point of change in presence status, for example, the range of sensor values. For the sensor node 11 shown in FIG. 2 being a temperature sensor, the presence status is assumed to change at a temperature higher than 30.0° C., i.e., at a temperature data value ≧30.0.

The server address allows the presence server 60 to be provided with a network address setting and uniquely identified in the presence-ready network 20. The presence server 60 being made identifiable in turn makes it possible to specify the presence service to be offered. The network address of the presence server 60 may have not a physical device address but instead a logical address description such as a SIP-URL (Session Initiation Protocol—Uniform Resource Locator).

The enable flag may be provided with an ON/OFF status setting indicative of whether the sensor node 11 or a non-presence-ready terminal should be enabled as a presence-ready terminal. The sensor node 11 with the enable flag having an ON status setting is registered (REGISTER) by the sensor node control part 52 with the presence server 60, and will function then as a presence-ready terminal onward.

Note that in the example setting shown in FIG. 4, the sensor node 11 is registered with the presence server 60. However, a plurality of sensor nodes including other than the sensor node 11 may also be registered with the presence server 60 for its service. That is, a set of multiple pieces of sensor data may be employed to create presence information.

Figure 5:
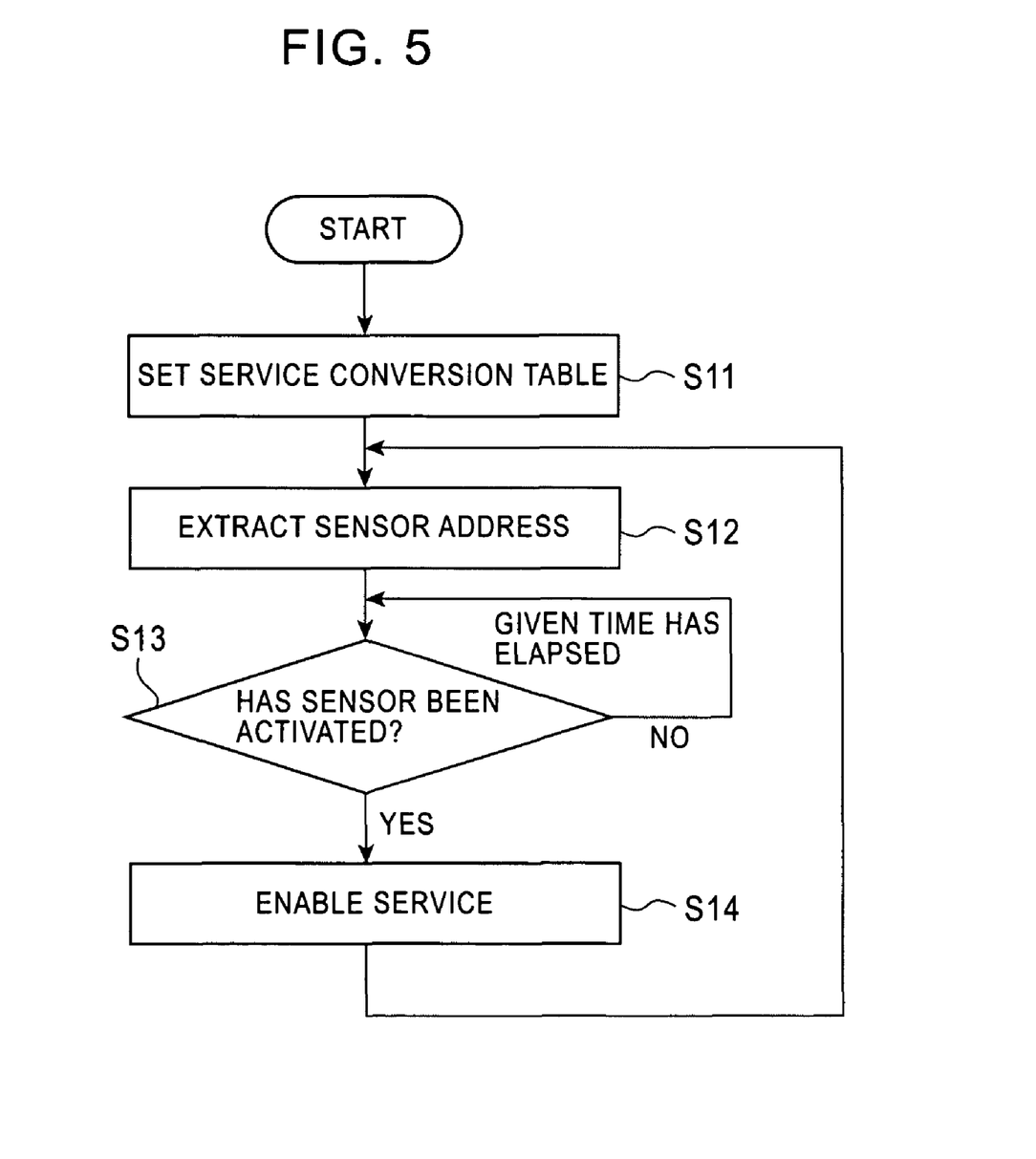
FIG. 5 is a flowchart showing the procedure for the service conversion server to register a sensor node serving as a non-presence-ready terminal with the presence server.

FIG. 5 shows a procedure for the service conversion server 50 to register the sensor node 11 or a non-presence-ready terminal with the presence server 60. After such registration, provision of actual presence service (see FIG. 7 to be described later) will be started.

First, the service conversion server 50 sets the sensor address, the sensing setting value, the presence definition, and the server address to the service conversion table 54 (step S11). In this example, the settings of the service conversion table 54 are input manually.

Next, the service conversion server 50 extracts one sensor address from the service conversion table 54 (step S12) to determine whether the sensor node associated with the sensor address has been activated (step S13). The method for extracting one sensor address from the service conversion table 54 is, for example, to extract one sensor node from top of the service conversion table 54 in sequence. In this embodiment, by way of example, the process determines whether the sensor node 11 has been activated. If the sensor node 11 is not active, the process turns OFF the enable flag, and after a predetermined period of time, determines again whether the sensor node is active (step S13). The determination of whether the node has been activated can be realized, for example, by the service conversion server 50 transmitting a confirmatory message to the sensor controller 30.

On the other hand, if the process determined that the sensor node 11 had been activated, the service conversion server 50 turns ON the enable flag for the sensor node 11 to enable the sensor node 11 (step S14). To enable the sensor node 11, the process registers it with the presence server 60 by transmitting the REGISTER message thereto and transmits control data to the sensor node 11 to set its operation mode. Subsequently, the process continues processing for another sensor node.

Figure 6:
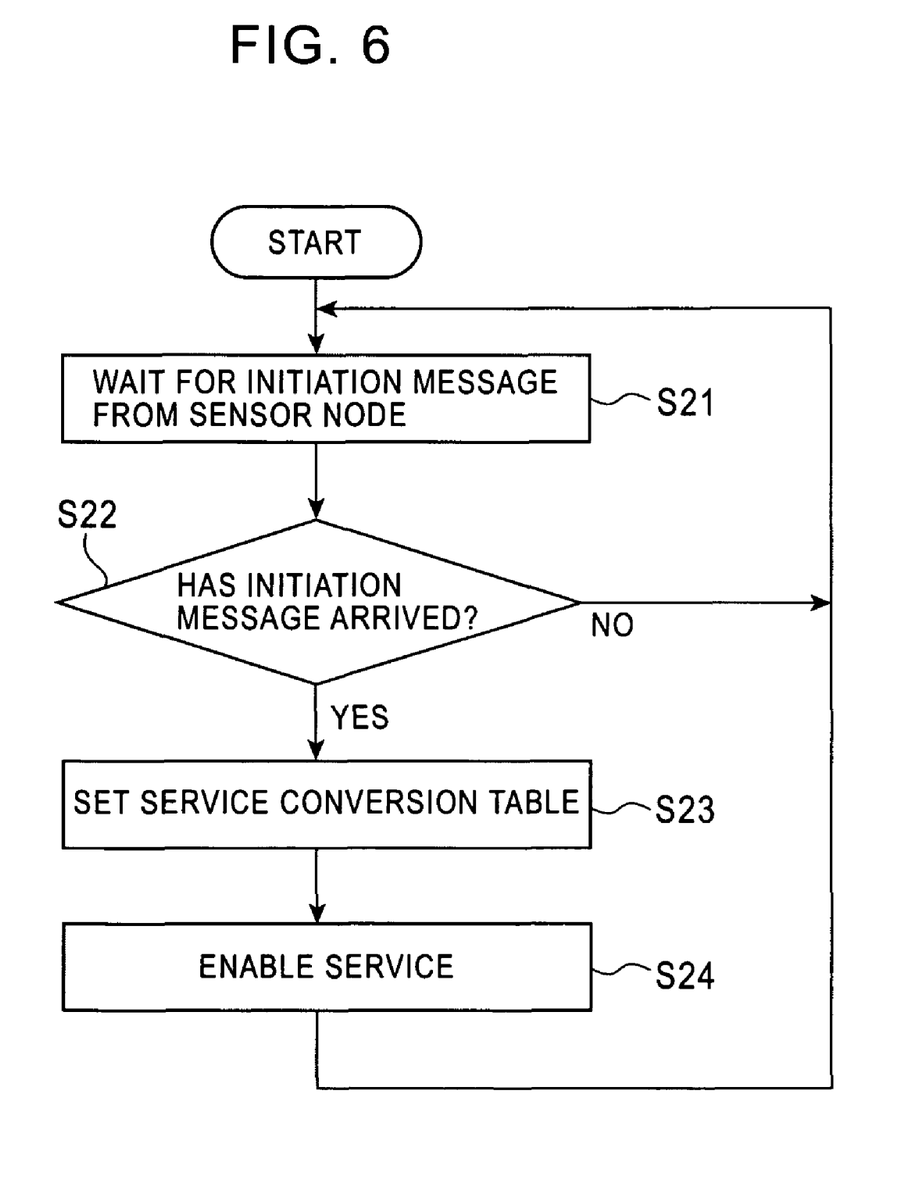
FIG. 6 is a flowchart showing a modified example of the procedure for the service conversion server to register a sensor node.

FIG. 6 shows a modified example procedure for the service conversion server 50 to register the sensor node 11. That is, in this modified example, the service conversion server 50 automatically creates the service conversion table 54.

The service conversion server 50 always keeps waiting for the initiation message from a sensor node (step S21). Here, it is assumed that once activated, the sensor node 11 automatically delivers the initiation message. In this context, the service conversion server 50 determines whether the initiation message has arrived (step S22). The service conversion server 50 returns repeatedly to step S21 to keep the wait status until the initiation message arrives.

If the initiation message has arrived from the sensor node 11, the service conversion server 50 extracts the sensor address of the sensor node 11 from the initiation message, and creates the sensing setting value, the presence definition, and the server address by associating them with the sensor address of the sensor node 11. Then, the server 50 sets these entries to the service conversion table 54 (step S23). These setting contents can be created, for example, based on the address list and the setting value lookup table that have been prepared in advance for each sensor node.

Now, the service conversion server 50 turns ON the enable flag for the sensor node 11 to enable the sensor node 11 (step S24). To enable the sensor node 11, the process registers it with the presence server 60 by transmitting the REGISTER message thereto and transmits control data to the sensor node 11 to set its operation mode. Subsequently, the process returns to step S21 to continue processing for another sensor node.

As can be seen clearly from the discussions above, the procedure shown in FIG. 5 or FIG. 6 makes it now possible to manage the presence server 60 as a presence-ready terminal, which was once a non-presence-ready terminal.

Figure 7:
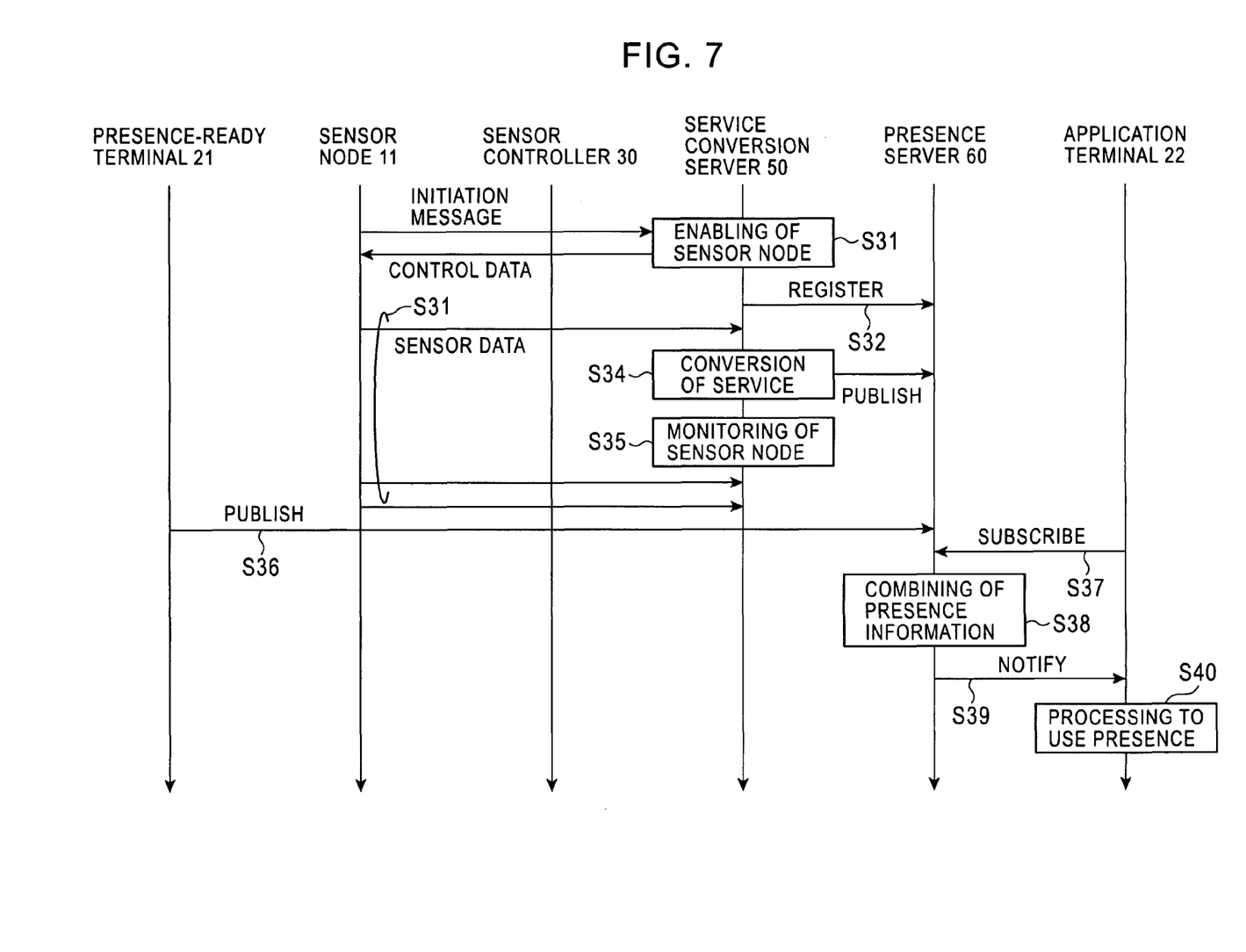
FIG. 7 is a sequence diagram showing the procedure for converting the sensor data of a sensor node into presence information to inform an application terminal of the information.

FIG. 7 illustrates the procedure for converting the sensor data of the sensor node 11 into presence information to inform the application terminal 22 of the resulting information.

First, the service conversion server 50 enables the sensor node 11 (step S31). The sensor node 11 is enabled based on the procedure shown FIG. 5 or in FIG. 6. For example, the operation is initiated in response to the initiation message from the sensor node 11 to create control data to be directed to the sensor node 11. Then, the service conversion server 50 registers the sensor node 11 with the presence server 60 by transmitting the REGISTER message thereto (step S32).

On the other hand, the contents of control data transmitted from the service conversion server 50 are set to the sensor node 11 directly or via the sensor controller 30. The sensor node 11 starts to create and transmit sensor data in accordance with the contents of control data (step S33). The transmitted sensor data is received by the service conversion server 50. The service conversion server 50 converts the received sensor data into presence information in accordance with the contents of the service conversion table 54, and then transmits the presence information as the PUBLISH message to the presence server 60 (step S34). From then onward, the service conversion server 50 creates and transmits presence information in response to a change in the value of the sensor data when the sensor data has been transmitted from the enabled sensor node 11.

Note that the service conversion server 50 does not need to create presence information each time the sensor node 11 transmits the sensor data. For example, the service conversion server 50 determines each time the sensor data is transmitted whether there is a change in the value of the sensor data, and if there is a change, transmits the presence information to the presence server 60. For example, the service conversion server 50 may create presence information and transmit it to the presence server 60 only when the value of the temperature sensor data has exceeded 30° C.

Furthermore, the service conversion server 50 may monitor a sensor node in parallel to create presence information in response to the result of monitoring (step S35). Such a monitoring result may be a problem with the sensor status of the sensor node 11 or the network status of the sensor network 10. Those modes will be described later with reference to FIG. 8.

On the other hand, the presence server 60 receives presence information from the service conversion server 50 and at the same time receives presence information (PUBLISH message) from a typical presence-ready terminal 21 (step S36). Here, suppose that a SUBSCRIBE message has arrived from the application terminal 22 as a request for acquiring presence information (step S37). The SUBSCRIBE message requests the delivery of presence information of a specific user by specifying the user. In this embodiment, the presence of the user is intended to be associated with the sensor node 11 and the presence-ready terminal. In this context, the presence server 60 combines the presence information from the service conversion server 50 (i.e., the presence information from the sensor node 11) and the presence information from the presence-ready terminal 21 into one piece of presence information (step S38).

The combination can be provided such that it includes only the presence information from the sensor node 11 or the combination of the presence information from the sensor node 11 and the presence information from the presence-ready terminal 21. Alternatively, various pieces of presence information may be produced for each combination of the presence status representative of one piece of presence information and the presence status indicative of the other piece of presence information.

Now, the presence server 60 sends the resulting presence information as a NOTIFY message to the application terminal 22 (step S39). The application terminal 22 carries out presence-ready processing in accordance with the contents of the NOTIFY message (step S40). For example, the terminal 22 may make a call for a call connection, or alternatively, simply indicate a change in the presence for the user to recognize it.

Figure 8:
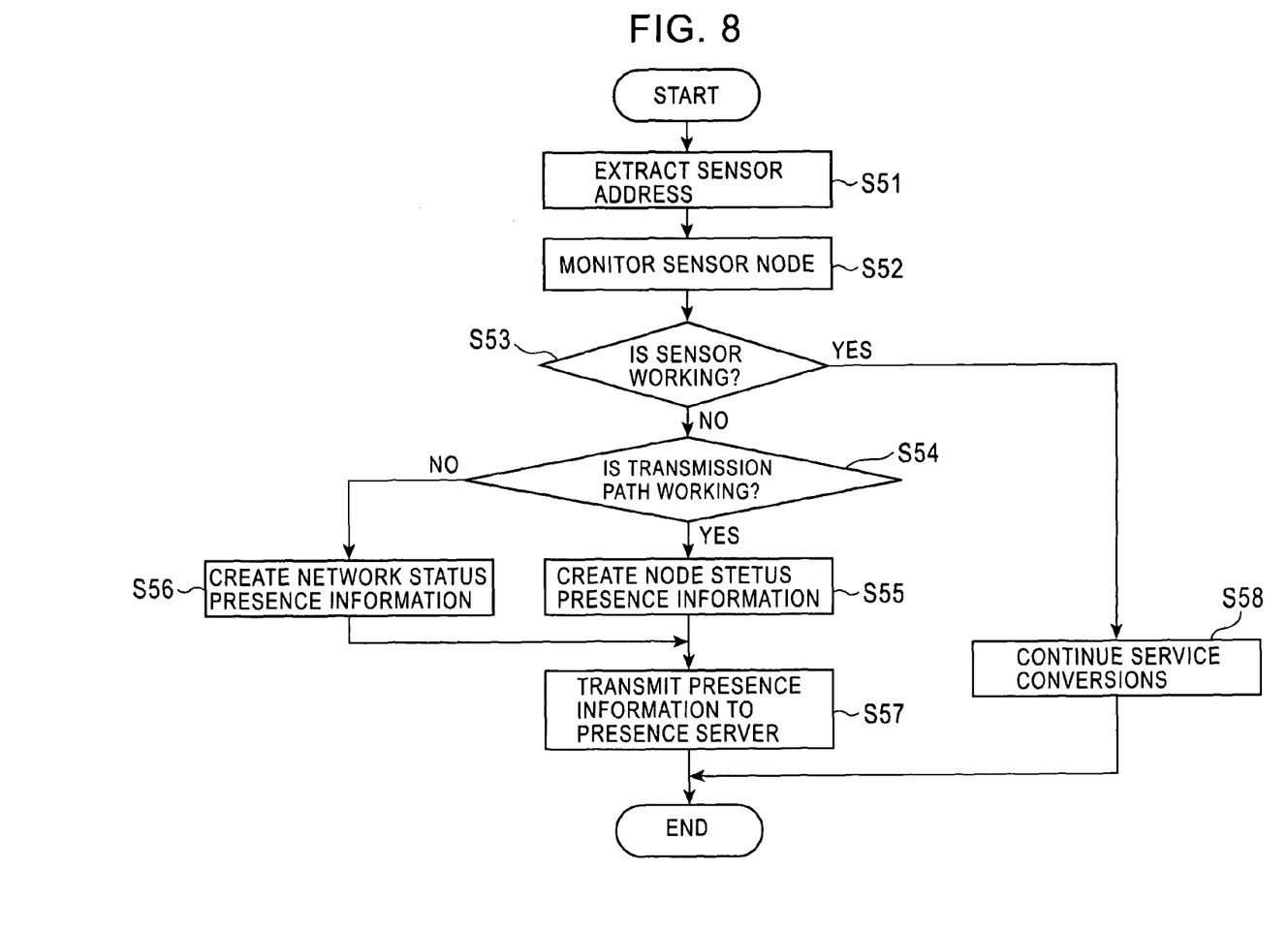
FIG. 8 is a flowchart showing detailed processing steps for monitoring the sensor node shown in FIG. 7.

FIG. 8 shows in more detail the sensor node monitoring procedure shown in FIG. 7.

First, the service conversion server 50 extracts one sensor address of those of non-presence-ready terminal nodes whose sensor node status is to be monitored (step S51). Then, the service conversion server 50 transmits a confirmatory message to check if the sensor node of the address (by way of example, the sensor node 11 in this embodiment) has been activated, thereby monitoring the sensor node 11 (step S52).

Then, the service conversion server 50 determines whether the sensor node 11 is working (step S53). If it is working, the service conversion server 50 continues service conversions for the sensor node 11 (step S58). For example, the sensor node 11 is determined to be working if the sensor node 11 sends back a response message to the confirmatory message within a give period of time.

On the other hand, if the sensor node 11 is determined to be not working, then the service conversion server 50 determines whether the transmission path leading to the sensor node 11 is normal without any network failure (step S54). The network failure on the transmission path may be expected to include, for example, a failure in the gateway 40 or a failure of an intermediate node on the sensor network 10. The gateway 40 can be determined to be normal or abnormal by periodically transmitting a diagnostic message to the gateway 40. An intermediate node on the sensor network 10 can be determined to be normal or abnormal, for example, according to the result of response to the inquiry message directed to the sensor controller 30 or another controlled node.

In step S54, the process may determine that the transmission path leading to the sensor node 11 is normal without any network failure. In this case, the process recognizes that the sensor node 11 itself is abnormal and then creates node status presence information indicating that the sensor node is failed. On the other hand, the transmission path may be determined to be abnormal with some network failure. In this case, the service conversion server 50 recognizes that there has occurred a failure on the transmission path leading to the sensor node 11, and then creates network status presence indicating that there is a network failure. Then, the process transmits the resulting node status presence information or network status presence to the presence server 60 (step S57).

The presence server 60 updates the presence information of the user associated with the sensor node 11 in response to the transmitted node status presence information or network status presence to prepare for a request to acquire the presence information of the user.

In the embodiment above, the presence conversion server is provided to collect sensor data from a sensor node and create presence information from the sensor data. This allows for obtaining not only presence information such as the online status of a PC operated by a person but also such presence information that contains circumstance presence information indicative of the emotion or ambient situations of a person. It is thus possible to grasp the presence of person in greater detail or in various forms.

Furthermore, in the above embodiment, presence could be recognized with improved reliability. This may be achieved by the service conversion server 50 monitoring the status of a sensor node when sensor data cannot be obtained as having been initially set, so that the status can be reflected on the presence information in the event of occurrence of a failure. On the other hand, not only presence information based on sensor data but also the presence information of a sensor node itself may be delivered, thereby allowing the user using the presence service to determine the reliability of the presence information.

In the above embodiment, the sensor node 11 was described as a sensor node that includes a temperature sensor; however, the present invention is not limited thereto. For example, a sound sensor may be alternatively employed so that at a sensor level greater than a certain value, multiple people present at the spot are considered to be talking to each other, thus creating presence information indicative of presence "being busy".

On the other hand, a cigarette smoke sensor may work allowing to create "At break (available to answering a call)," or a wash room human-sensitive sensor may act allowing to create "At break (unavailable to answering a call)." Other forms may be found, for example, as a kitchen gas meter being activated allowing to create "At break (unavailable to answering a call)." Furthermore, a high temperature or high humidity may lead to creating presence information as "uncomfortable."

Note that in the embodiment above, the presence-ready terminal 21 has been described as a communication node associated with a presence service and a terminal that can transmit presence information to the presence server 60. As a modified example of the present invention, the presence-ready terminal 21 may be provided with a function similar to that of the service conversion server 50. This may allow the terminal 21 to acquire not only the presence information created within the presence-ready terminal 21 but also the sensor data from the sensor node 11 via the sensor network 10 and the gateway 40. Thus, the terminal 21 could perform the service conversion function instead of the service conversion server 50.

This application is based on Japanese Patent Application No. 2009-194504 which is herein incorporated by reference.

What is claimed is:

1. A presence information provision method directed to a communication system which includes a plurality of communication terminals each associated with the presence of a specific user and a presence server for collecting presence information from the communication terminals and delivering presence information to the communication terminals, the method comprising:
   a circumstance presence information creation step for creating circumstance presence information pertaining to the user associated with one of the communication terminals in response to a change in value of sensor data transmitted from at least one sensor node terminal; and
   for the presence server to provide presence information, a circumstance presence information delivery step for delivering the circumstance presence information created in relation to said user associated with one of the communication terminals either in place of any previous presence information for said user associated with one of the communication terminals or in combination with any previous presence information for said user associated with one of the communication terminals,
   wherein the sensor data is transmitted from a non-presence-ready terminal, and
   wherein the circumstance presence information creation step creates the circumstance presence information from the sensor data in accordance with contents of a conversion table having a correspondence predefined between contents of the sensor data and contents of the circumstance presence information.

2. The presence information provision method according to claim 1, further comprising the step of setting a measurement mode for the sensor data by sending control data in advance to the sensor node terminal, the control data for defining the measurement mode for the sensor data to be measured by the sensor node terminal.

3. The presence information provision method according to claim 1, further comprising the step of
   detecting at least any one of a status of the sensor node terminal and a status of a network leading to the sensor node terminal, and
   wherein the circumstance presence information creation step creates status information indicative of the detected status as the circumstance presence information.

4. A presence information provision system comprising:
   a presence server for either collecting or delivering presence information indicative of presence of a specific user from or to a plurality of communication terminals each associated with the presence; and
   a service conversion server connected to the communication terminal and the presence server for creating circumstance presence information associated with the user in response to a change in value of sensor data transmitted from at least one sensor node terminal,
   wherein the sensor data is transmitted from a non-presence-ready terminal, and the service conversion server creates the circumstance presence information from the sensor data in accordance with contents of a conversion table having a correspondence predetermined between contents of the sensor data and contents of the circumstance presence information, and
   wherein, in order to deliver the presence information, the presence server delivers the circumstance presence information created in relation to the user either in place of the presence information or in combination with the presence information.

5. A presence information provision method directed to a communication system which includes a plurality of communication terminals each associated with the presence of a specific user and a presence server for collecting presence information from the communication terminals and delivering presence information to the communication terminals, the method comprising:
   a circumstance presence information creation step for creating circumstance presence information pertaining to the user associated with one of the communication terminals in response to a change in value of sensor data transmitted from at least one sensor node terminal;
   for the presence server to provide presence information, a circumstance presence information delivery step for delivering the circumstance presence information created in relation to said user associated with one of the communication terminals either in place of any previous presence information for said user associated with one of the communication terminals or in combination with any previous presence information for said user associated with one of the communication terminals, and
   a detection step for detecting at least any one of a status of the sensor node terminal and a status of a network leading to the sensor node terminal, wherein the circumstance presence information creation step creates status information indicative of the detected status as the circumstance presence information, and
   wherein the sensor data is transmitted from a non-presence-ready terminal.

* * * * *